United States Patent
Galgovich et al.

[11] Patent Number: 6,067,825
[45] Date of Patent: May 30, 2000

[54] SPARE WHEEL LOCK CONSTRUCTION

[75] Inventors: Paul F. Galgovich, Tonawanda; Thomas R. Lanham, Boston; Andrew D. Trank, Orchard Park, all of N.Y.

[73] Assignee: McGard, Inc., Orchard Park, N.Y.

[21] Appl. No.: 09/189,718

[22] Filed: Nov. 11, 1998

[51] Int. Cl.[7] .......................... B62D 43/04; E05B 65/12

[52] U.S. Cl. .................. 70/259; 70/454; 224/42.21; 224/42.23; 224/42.25; 414/463

[58] Field of Search .............................. 70/259, 260, 454, 70/370; 224/42.21, 42.23, 42.25; 414/463

[56] References Cited

U.S. PATENT DOCUMENTS

| | | | |
|---|---|---|---|
| 1,389,380 | 8/1921 | Raab | 70/454 |
| 1,561,254 | 11/1925 | Ledin | 70/370 |
| 1,818,373 | 8/1931 | Beuch | 70/259 |
| 2,140,441 | 12/1938 | Clark | 70/370 |
| 2,487,803 | 11/1949 | Heimann | 70/370 |
| 2,503,044 | 4/1950 | Guerra | 70/454 |
| 2,942,452 | 6/1960 | Marchese | 70/454 |
| 3,503,233 | 3/1970 | Russell et al. | 70/451 |
| 3,733,865 | 5/1973 | Vorob | 70/451 X |
| 3,865,264 | 2/1975 | Kuhns | 214/451 |
| 4,586,354 | 5/1986 | Smith | 70/370 X |
| 4,848,113 | 7/1989 | Parks | 70/259 |
| 4,988,023 | 1/1991 | Heathcoat | 224/42.21 |
| 5,251,467 | 10/1993 | Anderson | 70/370 |
| 5,435,159 | 7/1995 | Ramsauer | 70/370 |
| 5,606,883 | 3/1997 | Svec | 70/370 |
| 5,758,523 | 6/1998 | Kozlowski, Jr. et al. | 70/259 |

FOREIGN PATENT DOCUMENTS

| | | | |
|---|---|---|---|
| 2445880 | 9/1980 | France | 70/454 |
| 812290 | 8/1951 | Germany | 70/454 |
| 867208 | 2/1953 | Germany | 70/454 |
| 1518334 | 7/1978 | United Kingdom | 70/451 |

*Primary Examiner*—Lloyd A. Gall
*Attorney, Agent, or Firm*—Joseph P. Gastel

[57] ABSTRACT

A vehicle spare wheel lock construction including a lock body having a funnel guide mounted on one end thereof and a multi-fingered spring-type retaining washer mounted on the other end thereof for biting engagement with the internal surface of a handle receptacle of the winch. The lock body has a key-receiving groove in the end thereof and a key adapter is mounted on the end of a winch handle and has a curvilinear ridge on the end thereof which is guided into the curvilinear groove of the lock body by the frustoconical funnel guide and an adjacent internal frustoconical surface within the lock body.

23 Claims, 6 Drawing Sheets

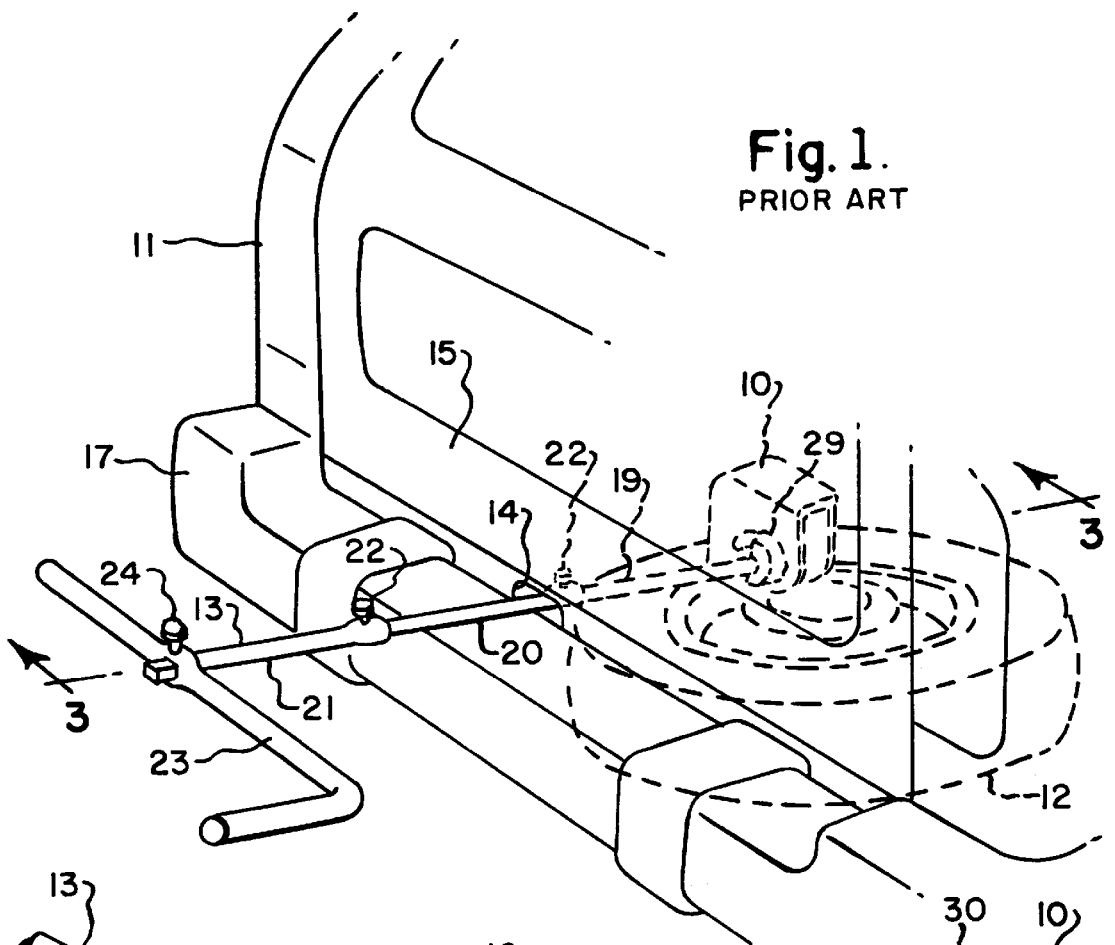
Fig. 1.
PRIOR ART
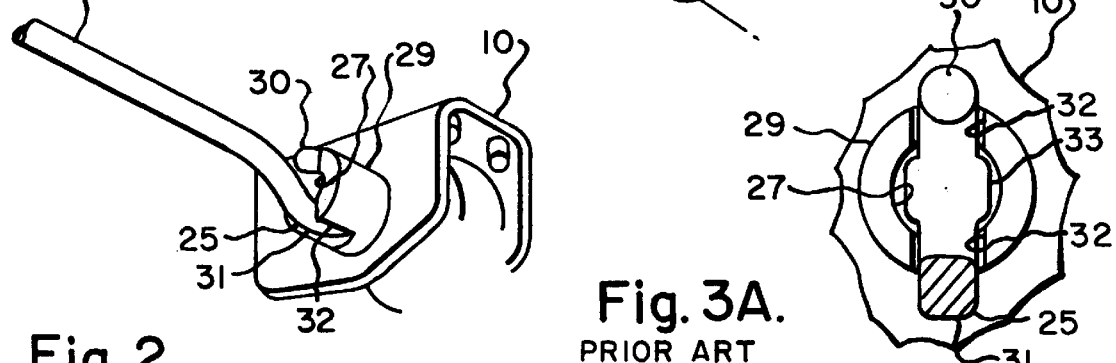
Fig. 2.
PRIOR ART
Fig. 3A.
PRIOR ART
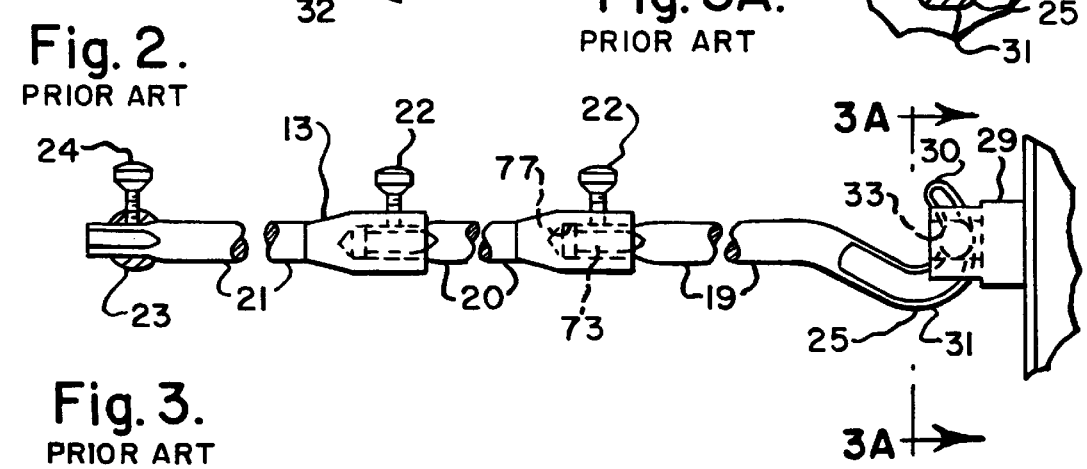
Fig. 3.
PRIOR ART

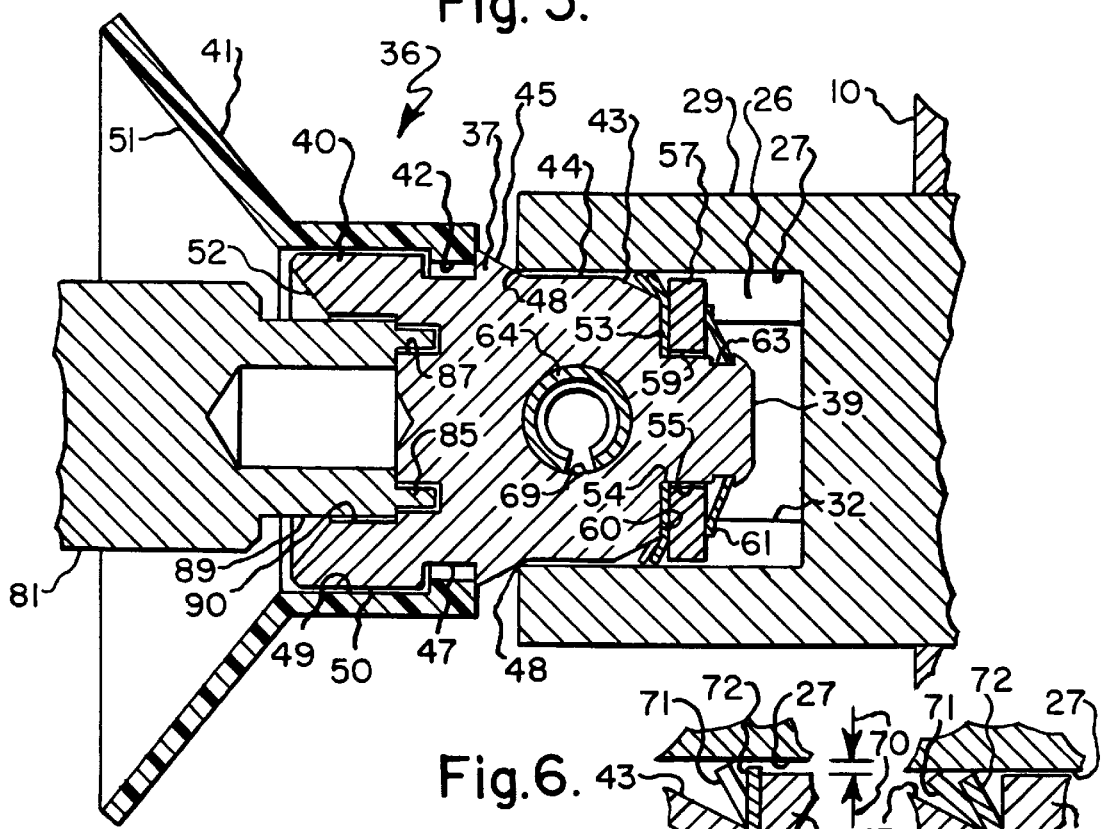

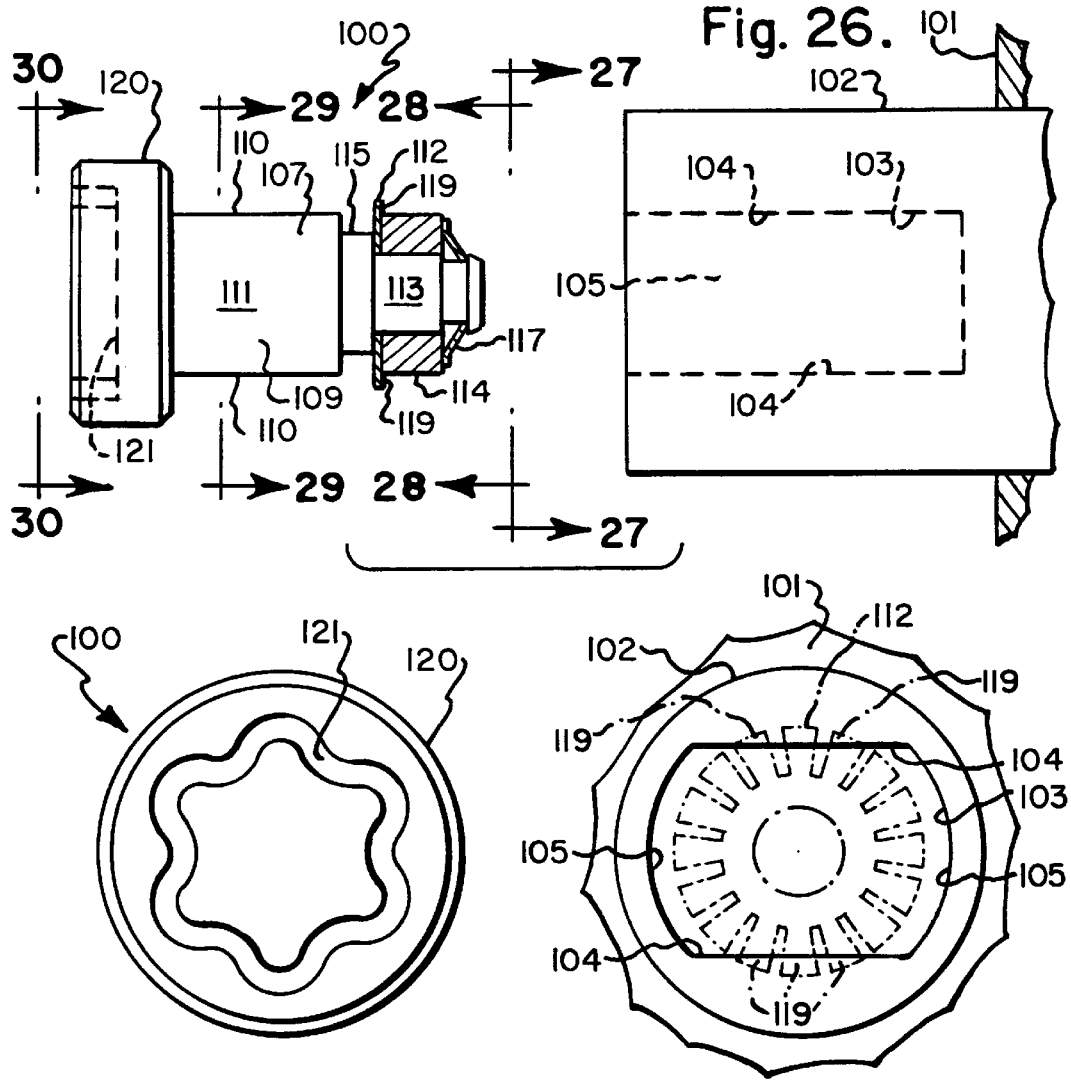
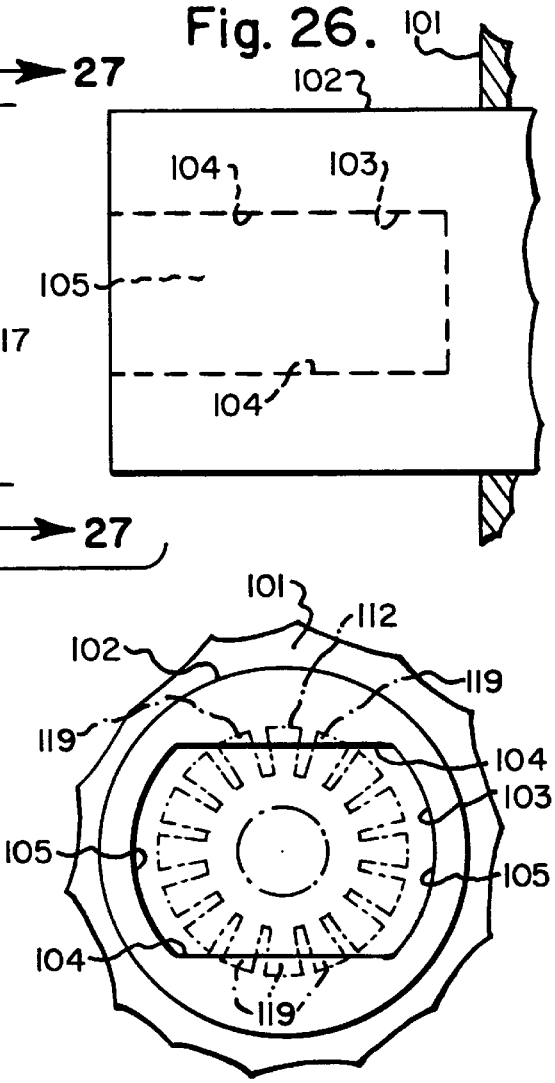
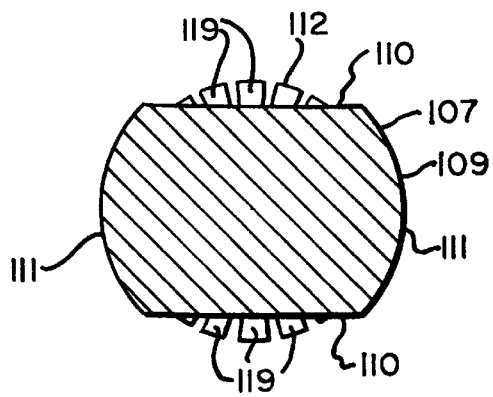
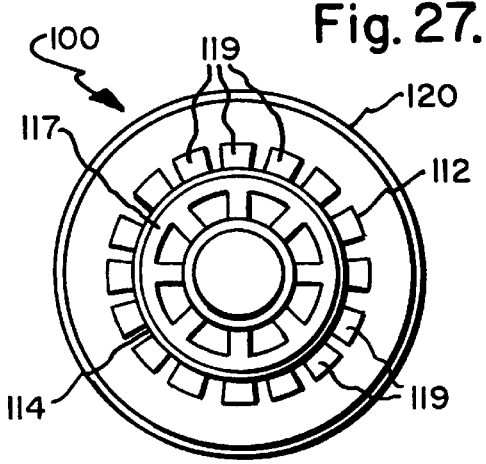
Fig. 26.
Fig. 30.
Fig. 27.
Fig. 29.
Fig. 28.

SPARE WHEEL LOCK CONSTRUCTION

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to a lock assembly for installation onto a prior art winch.

By way of background, numerous vehicles include a spare wheel winch which is used to raise a nd lower a spare wheel between its stored and accessible positions. In the past since the winch was readily accessible, there could be unauthorized removal of the spare wheel. Accordingly, there have been numerous lock devices developed in the past to prevent access to the spare wheel winch. It is with this general type of device that the present invention is concerned.

BRIEF SUMMARY OF THE INVENTION

It is one object of the present invention to provide a spare wheel lock construction which can be readily installed on a spare wheel winch without requiring modification of any portion of the existing spare wheel winch.

It is another object of the present invention to provide a spare wheel lock construction which can be installed in its operating position by merely pushing a portion of the lock assembly into an operative engagement with the existing winch structure.

A further object of the present invention is to provide a spare wheel lock construction which has structure thereon which guides a key to the key receptacle of the lock assembly in an extremely simple and efficient manner.

Yet another object of the present invention is to provide a key adapter for an existing winch handle. Other objects and attendant advantages of the present invention will readily be perceived hereafter.

The present invention relates to a spare wheel lock assembly comprising a lock body, a retaining washer mounted on said lock body, an end on said lock body, and a key-receiving configuration in said end.

The present invention also relates to a spare wheel lock assembly comprising a lock body having first and second ends and a central body portion therebetween, a retaining washer mounted on said first end, a funnel guide having a first funnel guide portion mounted on said second end of said lock body and having a second funnel guide portion extending outwardly beyond said second end of said lock body, and a key-receiving configuration on said second end of said lock body.

The present invention also relates to a lock assembly improvement for a vehicle spare wheel winch having a winch handle receptacle having a central opening with an internal surface, the improvement comprising a lock body having first and second ends and a central body portion therebetween, a retaining washer mounted on said first end and in gripping engagement with said internal surface, a funnel guide having a first funnel guide portion mounted proximate said second end of said lock body and having a second funnel guide portion extending outwardly beyond said second end of said lock body, and a key-receiving configuration on said second end of said lock body.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 1 is a fragmentary perspective view of a vehicle mounting a prior art spare wheel winch;

FIG. 2 is a fragmentary perspective view showing the prior art winch handle in engagement with the prior art winch handle receptacle;

FIG. 3 is a fragmentary side elevational view taken substantially along line 3—3 of FIG. 1 and showing the prior art winch handle in engagement with the prior art winch handle receptacle;

FIG. 3A is an enlarged fragmentary cross sectional view taken substantially along line 3A—3A of FIG. 3;

FIG. 4 is a fragmentary side elevational view of the lock assembly of the present invention mounted in the prior art winch handle receptacle;

FIG. 5 is a fragmentary cross sectional view taken substantially along line 5—5 of FIG. 4 and showing a key in engagement with the lock body;

FIG. 6 is a fragmentary enlarged view of a portion of FIG. 5 and showing the structure for retaining the lock assembly of FIG. 5 in an oversized bore of the winch handle receptacle;

FIG. 7 is a view similar to FIG. 6 and showing the structure for retaining the lock assembly in position in an undersized bore of the winch handle receptacle;

FIG. 26 is a fragmentary exploded side elevational view showing another embodiment of a spare wheel lock assembly positioned in spaced relationship to a prior art winch handle receptacle;

FIG. 27 is an end view of the winch handle receptacle taken substantially in the direction of arrows 27—27 of FIG. 26 and showing in dotted lines the multi-fingered lock-retaining washer superimposed thereon;

FIG. 28 is an end elevational view of the lock body with the retaining clip thereon;

FIG. 29 is a cross sectional view of the lock body taken along line 29—29 of FIG. 26; and FIG. 30 is an end elevational view taken substantially in the direction of arrows 30—30 of FIG. 26 and showing the curvilinear key-receiving groove in the end of the lock body.

DETAILED DESCRIPTION OF THE INVENTION

Figure 8:
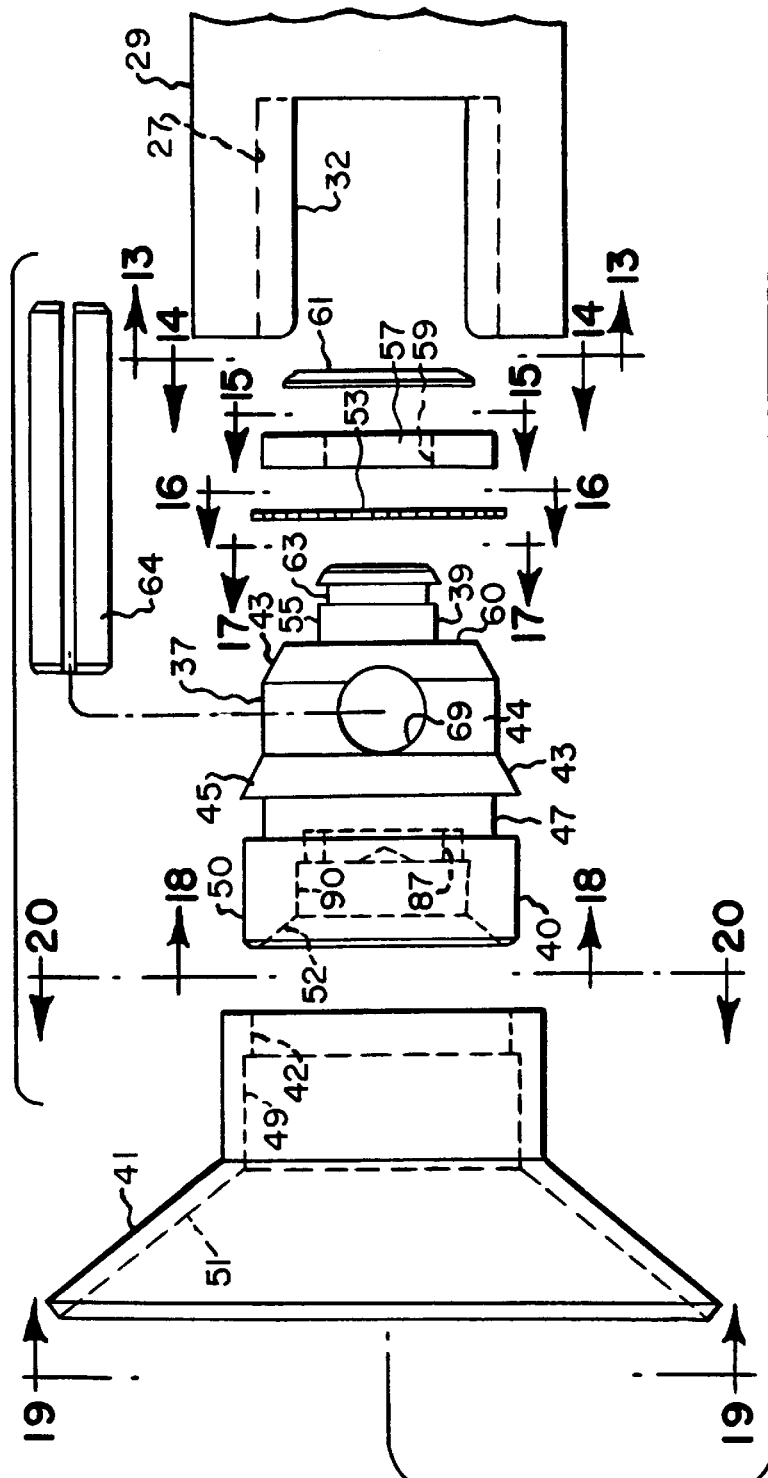
FIG. 8 is an exploded view of the various parts of the lock assembly in relationship to the prior art winch handle receptacle.
Figure 12:
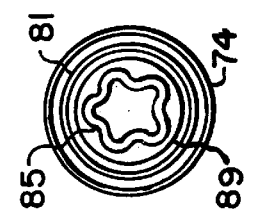
FIG. 12 is an end elevational view taken substantially in the direction of arrows 12—12 of FIG. 9 showing the ridge on the end of key adapter.
Figure 13:
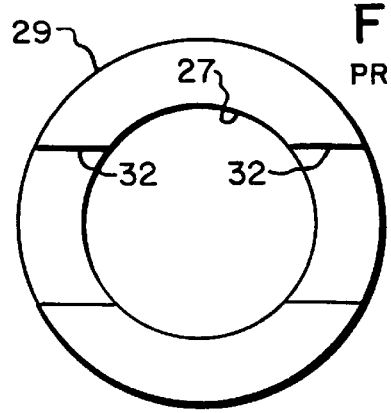
FIG. 13 is a view of the winch handle receptacle taken substantially in the direction of arrows 13—13 of FIG. 8.
Figure 14:
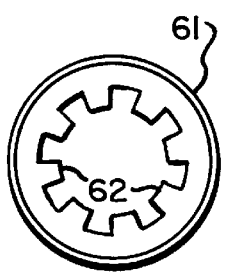
FIG. 14 is a view of the retaining clip taken substantially in the direction of arrows 14—14 of FIG. 8.
Figure 15:
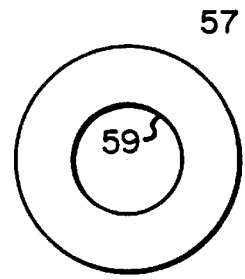
FIG. 15 is a view of the spacer washer taken substantially in the direction of arrows 15—15 of FIG. 8.
Figure 16:
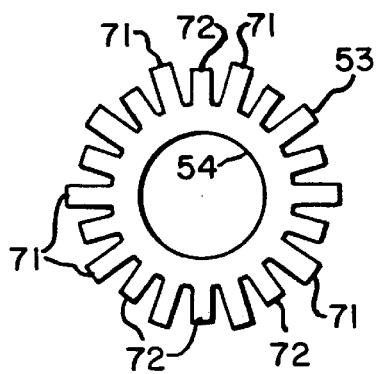
FIG. 16 is a view of the multi-fingered lock retaining washer taken substantially in the direction of arrows 16—16 of FIG. 8.
Figure 18:
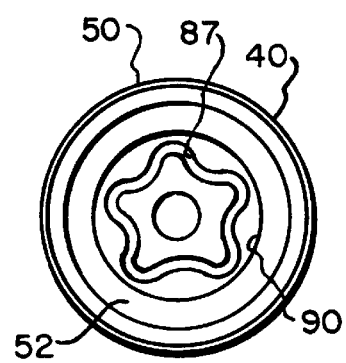
FIG. 18 is a view of the lock body taken substantially in the direction of arrows 18—18 of FIG. 8.
Figure 17:
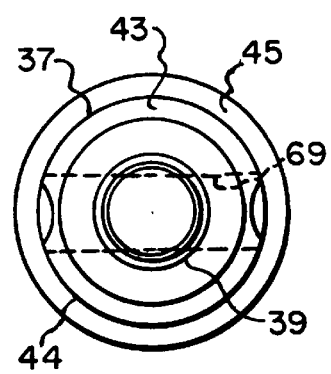
FIG. 17 is a view of the lock body taken substantially in the direction of arrows 17—17 of FIG. 8.
Figure 19:
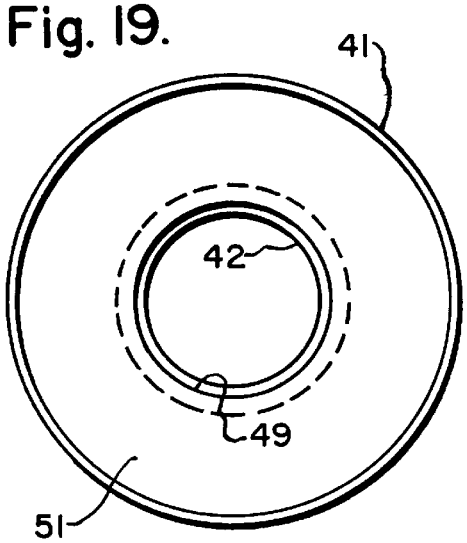
FIG. 19 is a view of the funnel guide taken substantially in the direction of arrows 19—19 of FIG. 8.
Figure 20:
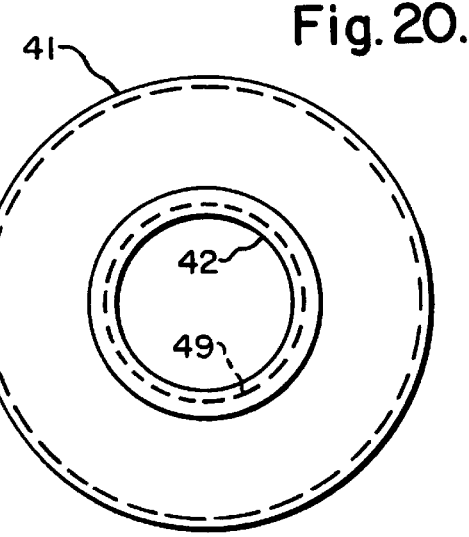
FIG. 20 is a view of the funnel guide taken substantially in the direction of arrows 20—20 of FIG. 8.
Figure 21:
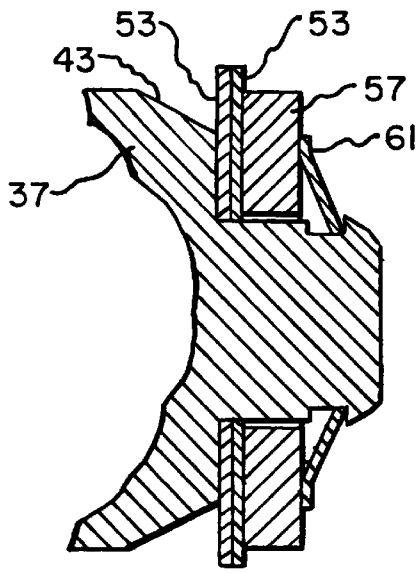
FIG. 21 is a fragmentary cross sectional view of the lock body mounting two multi-fingered lock retaining washers thereon.

In FIGS. 1–3 a prior art arrangement is shown wherein a winch 10 is suitably mounted on the rear of vehicle 11 for raising and lowering the spare wheel 12 by means of a cable (not shown) extending outwardly from winch 10 and attached to wheel 12. The winch 10 is actuated by inserting the prior art winch handle 13 through hole 14 in the lower portion of the vehicle body 15 adjacent rear bumper 17. The prior art handle 13 includes a plurality of sections 19, 20 and 21 secured to each other in end-to-end telescopic relationship by set screws 22. Section 21 extends through cross handle 23 which is retained on the end of handle section 21 by means of a screw 24. To actuate the winch, the winch handle 13 is inserted through opening 14 so that the crook portion 25 at the end of handle section 19 is inserted into opening or bore 26 having an internal surface 27 (FIGS. 8 and 13) of winch handle receptacle 29 with the portions 30 and 31 (FIG. 3) of crook 25 extending through diametrically opposed slots 32 and with a central enlarged portion 33 of crook 25 being located between slots 32.

The spare wheel lock assembly 36 of the present invention, as shown in FIGS. 4–20, adds onto the prior art winch handle receptacle 29 to provide an arrangement which requires a specialized key to actuate winch 10, and, in addition, provides an arrangement for positively guiding the key into operative engagement with the lock construction. The improved lock assembly 36 includes a lock body 37 having a first end 39 and a second end 40. A slightly elastic plastic funnel guide 41 is mounted on end 40 by slipping it over the first end 39 of the lock body so that the internal ridge 42 rides over the first end 39 across tapered portion 43, along cylindrical portion 44, over tapered shoulder 45 and thereafter seats into annular groove 47 so that the funnel guide 41 is retained in the position shown in FIG. 5 with its cylindrical inner surface 49 in contiguous relationship to cylindrical surface 50 of lock body 37. The funnel guide includes an internal frustoconical surface 51 which lines up with internal frustoconical surface 52 of lock body 37.

The lock assembly 36 also includes a multi-fingered lock retaining washer 53 (FIG. 16) which has an internal aperture 54 which mounts onto neck 55 at end portion 39. A spacer washer 57 also has an internal aperture 59 which is used to mount the spacer washer on end portion 39 so that lock retaining washer 53 is held between it and shoulder 60 on lock body 37. A retaining clip 61 snaps onto end 39, and it s flexible internal teeth 62 are received in groove 63 thereby retaining spacer washer 57 a nd lock retaining washer in assembled relation ship onto end 39 of lock body 37. A pin 64 (FIG. 4) extends through bore 69 in lock body 37 and is retained therein by a press-fit.

The lock assembly 36 is installed into prior art winch handle receptacle 29 by pushing the lock body 37 into bore 27 with the ends 65 of pin 64 being received in slots 32 of the winch handle receptacle 29. While the pin 64 is shown as extending out of opposite sides of the lock body 37, it will be appreciated that a pin extending out of only one side can also function satisfactorily. Also, the pin may be formed integrally with the lock body, if the latter was formed of powdered metal. As can be seen from FIGS. 6 and 7, the multi-fingered lock retaining washer 53 flexes to retain the lock body 37 in permanently installed position within bore 27. In this respect, bore 27 i s not of a precise diameter but may vary within the limits depicted by the spacing shown between arrows 70 which are positioned between FIGS. 6 and 7. When the opening or bore 26 is of a larger diameter, the longer fingers 71 (FIG. 16) will flex to the position shown in FIG. 6 to thereby bite into the internal surface 27 of winch handle receptacle 29. When the internal surface 27 is of a smaller diameter, the shorter fingers 72 will flex, as shown in FIG. 7, to bite into the internal surface 27, and the longer fingers 71 will flex to a greater extent. The tapered portion 43 of lock body 37 provides the necessary clearance to permit fingers 71 and 72 to flex to the positions shown in FIGS. 6 and 7. Once fingers 71 or 72 bite into internal surface 27, the lock assembly 36 cannot be withdrawn, and it is installed permanently.

During installation of the lock assembly 36 into handle receptacle 27, as the lock body 36 moves from left to right in FIG. 5 to its fully installed position, the close dimensions between the diameter of the internal surface 27 of the handle receptacle 29 and the external diameters of the spacer washer 57 and the cylindrical portion 44 of lock body 37 will guide the lock body 37 coaxially into handle receptacle 29 and will retain it in coaxial relationship after it is fully installed. Additionally, the tapered shoulder 45 centers the pattern end 40 of the lock body in the handle receptacle by bearing against the edges 48 (FIG. 5) of the handle receptacle to adjust for a range of internal diameters and variations in the configurations of edges 48 of handle receptacle 29.

Figure 9:
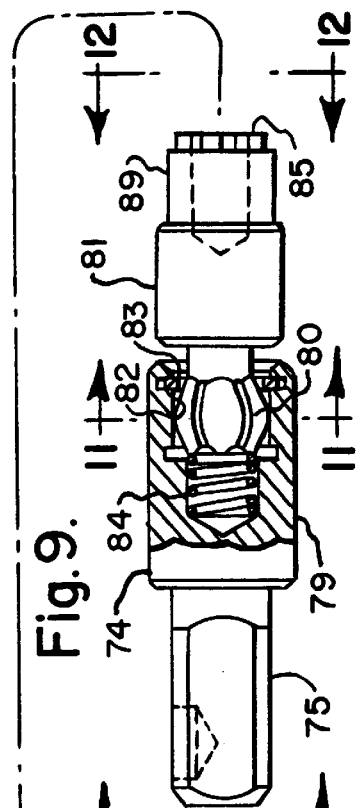
FIG. 9 is a side elevational view, partially in cross section, of the key adapter which is to be mounted on the winch handle or operating the lock assembly of FIGS. 4–8.
Figure 11:
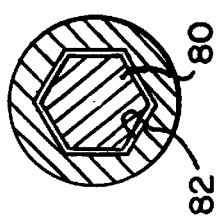
FIG. 11 is a fragmentary cross sectional view of the key adapter taken substantially along line 11—11 of FIG. 9.
Figure 10:
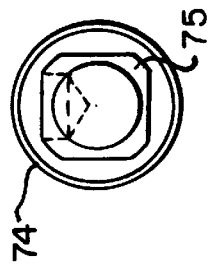
FIG. 10 is an end elevational view of the key adapter taken substantially in the direction of arrows 10—10 of FIG. 9.

The prior art winch handle 13 of FIGS. 1–3 is modified to coact with lock assembly 36. In this respect, the end section 19 (FIGS. 2 and 3) is removed from handle section 20 by loosening set screw 22 and removing the end 73 of section 19 from bore 77 in section 20. Thereafter, the key adapter 74 (FIG. 9) is installed into handle section 20 by inserting end 75 of the key adapter into bore 77 of handle section 20 and tightening set screw 22. The key adapter 74 includes a central portion 79 which receives hexagonal end 80 of key 81 in bore 82. Hexagonal end 80 is retained in bore 82 by means of clip 83, and it is spring-biased to the right in FIG. 9 by spring 84. The outer edges of hexagonal portion 80 are curved as shown in FIG. 9 so that it can pivot in bore 82, but it will be retained in its pivoted position by the force of spring 84. The fact that key 81 can pivot as the handle 13 is turned, provides a universal connection to body 79. The end of key 81 has a curvilinear ridge 85 thereon which is received in curvilinear groove 87 in lock body 37. The cylindrical portion 89 of key 81 is received closely adjacent to internal cylindrical surface 90 (FIG. 5) of lock body 37 to thereby stabilize the key in position against cocking about its longitudinal axis as key 81 is rotated by handle 13 and as the axis of key 81 pivots relative to the remainder of the key adapter 74 as the universal joint at 80 pivots. The foregoing pivoting is due to the fact that the longitudinal axis of handle 13 is set off at an angle from the axis of lock body 37.

The funnel guide 41 and the adjacent second end portion 40 of the lock body facilitate the entry of key 81 into its operating relationship wherein curvilinear ridge 85 enters curvilinear groove 87. In this respect, as the handle 13 with key adapter 74 mounted on t he end thereof approaches the lock assembly 36, the ridge portion 89 will hit the inner surface 51 of funnel guide 41 and will be directed inwardly toward lock body 37. The internal frustoconical surface 52 of lock body 37 is aligned (FIG. 5) with internal surface 51 of funnel guide 41 and thus the key will slide further and enter the cylindrical portion 90 within the lock body. Thereafter, the handle is turned until the curvilinear ridge 85 enters the curvilinear groove 87 a nd thereafter the winch handle receptacle 29 can be rotated to thereby rotate the main shaft (not shown) of the winch 10. The foregoing will result in the cable (not shown) associated with the winch either raising the attached wheel or lowering it, depending on the direction in which the handle 13 is rotated.

In FIGS. 21–25 another embodiment of the present invention is disclosed. In this embodiment numerals which are identical to numerals shown in the previous drawings represent identical elements of structure. The embodiment of FIGS. 21–25 differs from the embodiment of FIGS. 4–20 only in that the lock body 37 mounts two multi-fingered lock-retaining washers 53 rather than only one.

Figure 22:
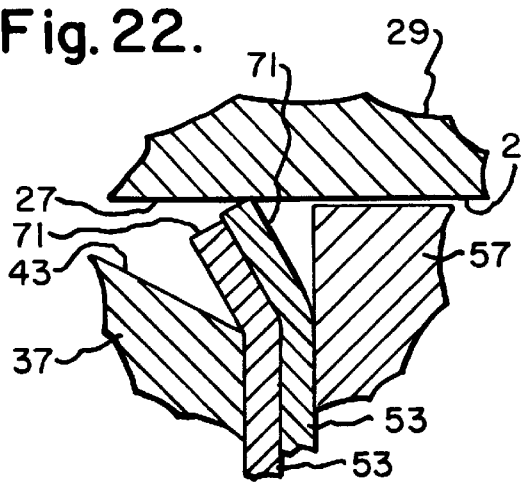
FIG. 22 is an enlarged fragmentary cross sectional view showing the embodiment of FIG. 21 mounted within an oversized bore and showing the positions assumed by the longer fingers when they are in complete or partial overlapping relationship.
Figure 23:
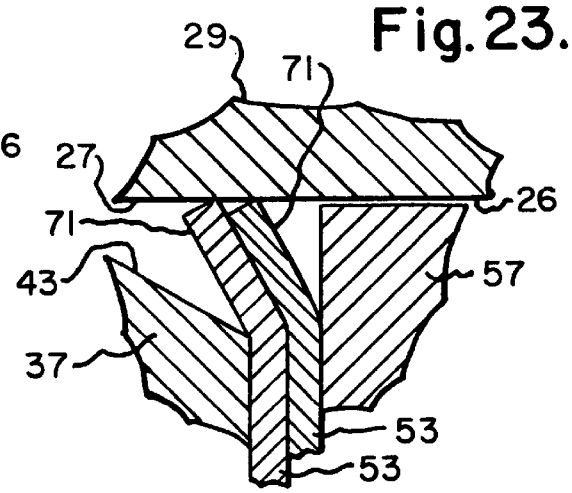
FIG. 23 is a view similar to FIG. 22 but showing the positions of the long fingers in an oversized bore when they are not in overlapping relationship.

FIG. 22 shows the relationship between the longer fingers 71 of retaining washers 53 when the former are in completely or partially overlapping condition in a larger size bore 26. In this situation the fingers closest to spacer washer 57 will bite into internal surface 27 of handle receptacle 29, and the longer fingers 71 furthest from spacer washer 57 will underlie and provide resilient support to the fingers 71 of the retaining washer 53 which bite into surface 27. When the longer fingers 71 of retaining washers 53 are interdigitated, that is, when they are not overlapping at all, the outer ends of both longer fingers 71 will bite into internal surface 27 of handle receptacle 29, as shown in FIG. 23.

Figure 24:
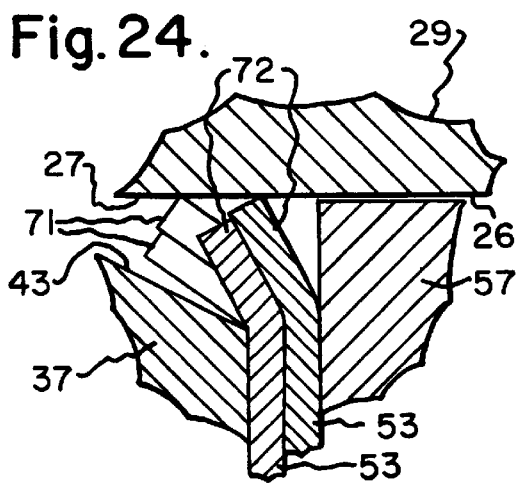
FIG. 24 is an enlarged fragmentary cross sectional view showing the relationships between the short fingers in an undersized bore when the short fingers are in wholly or partial overlapping relationship and also showing the positions assumed by the long fingers.
Figure 25:
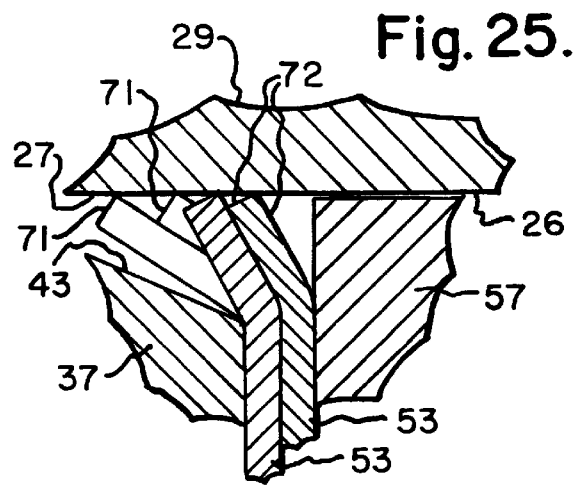
FIG. 25 is a view similar to FIG. 24 but showing the positions of the long fingers and the short fingers when they are in an undersized bore and are not in overlapping relationship.

When the bore 26 is of smaller diameter, the situations shown in FIGS. 24 and 25 can exist. In this situation, as shown in FIG. 24, if the shorter fingers 72 are wholly or partially overlapping, only the fingers 72 closest to spacer washer 57 will bite into internal surface 27 of handle receptacle 29, while the fingers 72 which are spaced farther from washer spacer 57, will provide resilient support to the fingers 72 which bite into surface 27. Under these circumstances, the longer fingers 71 will also be in overlapping condition and they will assume the positions shown in FIG. 24 wherein the fingers 71 of the retaining washer 53, which is further from spacer washer 57, will underlie the other fingers 71 closest to spacer washer 57 and they lend resilient support thereto when the latter bite into inner surface 27.

When the fingers of the two retaining washers 53 are interdigitated, that is, when they are not overlapping wholly or partially, and when the retaining washers are located in a bore 26 of smaller diameter, then the shorter fingers 72 of both retaining washers 53 will bite into internal surface 27, as will both longer fingers 71.

Thus, the embodiment of FIGS. 21–25 will provide good biting engagement of the various fingers under various conditions as described above.

In FIGS. 26–30 another embodiment of a spare wheel lock assembly 100 is disclosed for use with a spare wheel winch 101 having a winch handle receptacle 102 having an irregular bore 103 therein. In the present instance bore 103 has two opposed straight sides 104 and two curved sides 105. The spare wheel lock assembly 100 includes a lock body 107 having a central portion 109 having opposite straight sides 110 and curved sides 111. The central body portion is of slightly smaller dimension than internal recess 103 so that when it is inserted into it, it will provide a driving relationship with the winch handle receptacle 102. A multi-fingered lock retaining washer 112 is mounted on reduced end portion 113 of lock body 107 and it is held between spacer washer 114 and a shoulder provided by reduced portion 115 of lock body 107. A retaining washer 117 bears against spacer washer 114 to hold the latter and retaining washer 112 in assembled relationship on lock body 107.

As can be visualized from FIG. 27, when the lock assembly 100 is inserted into recess 103, the resilient fingers 119 will flex and bite into sides 104 of recess 103 to thereby retain the lock assembly 100 in position within recess 103.

An enlarged end 120 of lock assembly 100 includes a curvilinear groove 121 which receives a suitable key for turning the lock body 107 and the handle receptacle 102 to thereby drive the winch.

While the recess 103 has been shown as having two straight sides which have a driving relationship with two straight sides of the lock body, it will be appreciated that the lock body can be of any suitable cross sectional configuration to match an irregular or noncircular cross sectional configuration of a winch handle receptacle to establish a driving relationship therewith.

While preferred embodiments of the present invention have been disclosed, it will be appreciated that it is not limited thereto but may be otherwise embodied within the scope of the following claims.

What is claimed is:

1. In a vehicle spare wheel winch having a winch handle receptacle having a central opening with an internal surface, the improvement comprising a lock body having first and second ends and a central body portion therebetween, a retaining washer mounted on said first end and in gripping engagement with said internal surface, a funnel guide having a first funnel guide portion mounted proximate said second end of said lock body and having a second funnel guide portion extending outwardly beyond said second end of said lock body, and a key-receiving configuration on said second end of said lock body.

2. In a vehicle spare wheel winch as set forth in claim 1 including a spacer washer mounted on said first end of said lock body and having an outer edge located adjacent said internal surface of said winch handle receptacle.

3. In a vehicle spare wheel winch as set forth in claim 1 wherein said central portion of said lock body is located in adjacent relationship to said internal surface of said winch handle receptacle.

4. In a vehicle spare wheel winch as set forth in claim 1 where in said winch handle receptacle has an outer end with an edge thereon, and a shoulder on said central body portion in engagement with said edge of said end of said handle receptacle.

5. In a vehicle spar e wheel winch as set forth in claim 4 wherein said shoulder is tapered.

6. In a vehicle spare wheel winch as set forth in claim 1 wherein said funnel guide includes a first internal frustoconical configuration, and wherein said second end of said lock body includes a second internal frustoconical configuration in substantial alignment with said first internal frustoconical configuration.

7. In a vehicle spare wheel winch as set forth in claim 6 wherein said key-receiving configuration is located within said lock body.

8. In a vehicle spare wheel winch as set forth in claim 7 including an internal cylindrical wall in said lock body between said key-receiving configuration and said second internal frustoconical configuration.

9. In a vehicle spare wheel winch as set forth in claim 1 wherein said winch handle receptacle incudes diametrically opposed slots, and a pin extending radially outwardly from said lock body and located in at least one of said opposed slots.

10. A spare wheel lock assembly comprising a lock body having first and second ends and a central body portion therebetween, a retaining washer mounted on said first end, an outer periphery on said retaining washer which extends radially outwardly beyond said first end of said lock body, a funnel guide, a first funnel guide portion of said funnel guide mounted on said second end of said lock body in spaced relationship to said retaining washer, a second funnel guide portion of said funnel guide extending outwardly beyond said second end of said lock body, and a key-receiving configuration on said second end of said lock body.

11. A spare wheel lock assembly as set forth in claim 10 wherein said retaining washer includes fingers of different radial lengths.

12. A spare wheel lock assembly as set forth in claim 11 wherein said fingers of different radial lengths are positioned in alternating relationship.

13. A spare wheel lock assembly as set forth in claim 10 wherein said second funnel guide portion includes an internal funnel guide surface of frustoconical configuration.

14. A spare wheel lock assembly as set forth in claim 13 wherein said second end of said lock body includes a second internal frustoconical surface which is a continuation of said internal funnel guide surface of frustoconical configuration.

15. A spare wheel lock assembly as set forth in claim 10 including a shoulder on said central body portion facing said first end of said lock body.

16. A spare wheel lock assembly as set forth in claim 10 including a spacer washer mounted on said first end of said lock body on the opposite side of said retaining washer from said second end of said lock body.

17. A spare wheel lock assembly as set forth in claim 10 wherein said key-receiving configuration is located within said second end of said lock body.

18. A spare wheel lock assembly as set forth in claim 17 including an internal cylindrical surface in said second end of said lock body adjacent said key-receiving configuration.

19. A spare wheel lock assembly comprising a lock body having first and second ends and a central body portion therebetween, a retaining washer mounted on said first end, a funnel guide having a first funnel guide portion mounted on said second end of said lock body and having a second funnel guide portion extending outwardly beyond said second end of said lock body, a key-receiving configuration on said second end of said lock body, said key-receiving configuration being located within said second end of said lock body, an internal cylindrical surface in said second end of said lock body adjacent said key-receiving configuration, and an internal frustoconical surface in said second end of said lock body on the opposite side of said cylindrical surface from said key-receiving configuration.

20. A spare wheel lock assembly as set forth in claim 10 including a pin extending radially outwardly from said central body portion.

21. A spare wheel lock assembly as set forth in claim 10 including a second retaining washer mounted on said first end.

22. A spare wheel lock assembly for frictionally engaging a winch handle receptacle comprising a lock body, retaining washer means for fixedly securing said lock body against movement relative to an external member, said retaining washer means being mounted against axial movement on said lock body, an outer periphery on said retaining washer means, resilient biting finger means on said outer periphery which extend radially outwardly from said lock body for frictionally engaging said winch handle receptacle, an end on said lock body, and a key-receiving configuration in said end.

23. A spare wheel lock assembly as set forth in claim 22 wherein said lock body is of noncircular cross section.

* * * * *